United States Patent
Bidwell

[11] 3,768,333
[45] Oct. 30, 1973

[54] DETENT MECHANISM
[75] Inventor: Donald E. Bidwell, Lemon Grove, Calif.
[73] Assignee: J. C. Pemberton, San Diego, Calif.
[22] Filed: Oct. 17, 1972
[21] Appl. No.: 298,206

[52] U.S. Cl............... 74/527, 200/166 SD, 251/297
[51] Int. Cl.............................................. G05g 5/06
[58] Field of Search................ 74/527; 200/166 SD, 200/166 BE; 251/297

[56] References Cited
UNITED STATES PATENTS
3,258,980  7/1966  Swanson ........................ 74/527 X FOREIGN PATENTS OR APPLICATIONS
959,325  9/1949  France ................................ 74/527

Primary Examiner—Milton Kaufman
Attorney—Warren T. Jessup et al.

[57] ABSTRACT

A rotatably adjustable shaft is detented into a number of positions by sets of spring-pressed ball detents. Each set of balls consists of a pair of balls which, through rolling friction, counter rotate, so that a spring pressed washer that biases the balls into detent position rotates with the shaft. In this manner sliding friction is substantially eliminated, with consequent elimination of frictional drag as the shaft is turned.

3 Claims, 4 Drawing Figures

PATENTED OCT 30 1973 3,768,333

1

DETENT MECHANISM

DESCRIPTION OF THE DRAWINGS

FIG. 3 shows the mechanism in detented position. FIG. 4 shows the mechanism in transient position as the shaft is being turned from one detent position to an adjacent detent position.

DESCRIPTION OF A PREFERRED EMBODIMENT

Figure 1:
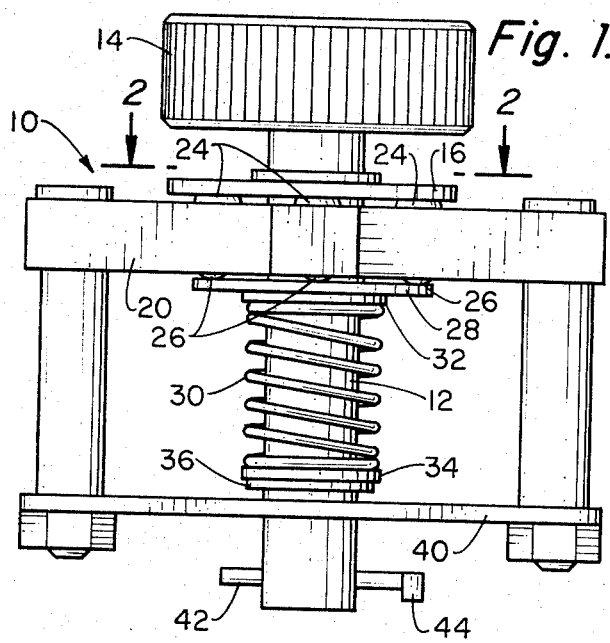
FIG. 1 is a top view of the detent mechanism.
Figure 2:
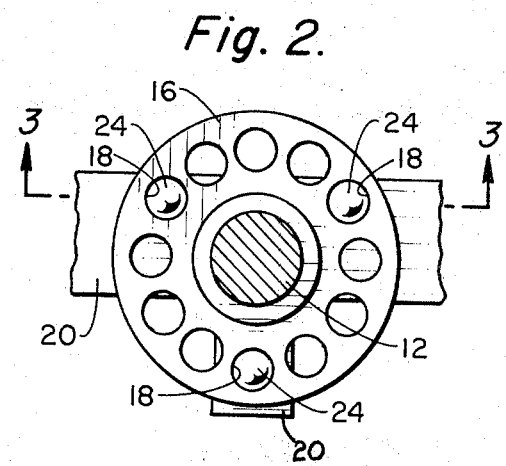
FIG. 2 is a cross section taken on line 2—2 in FIG. 1.

The dentent mechanism of the present invention comprises a support or frame shown generally at 10, in which is journaled a shaft 12 rotated by any suitable means, such as a manually operable knob 14. The shaft 12 comprises a portion of the detentable member of the present invention and has fixedly secured to it a circular detent plate or wheel 16. The wheel 16 is provided with a series of recesses in the form of holes 18 passing through the plate 16, which are located on a circle coaxial with the shaft 12. The frame 10 includes a transverse plate 20 of appreciable thickness, which has three equiangularly spaced passages or channels 22 passing therethrough located at the same radius as the recesses 18 in the detent plate 16. Riding in each of the channels 22 are a pair of aligned steel balls 24 and 26, the former being of a diameter such as to engage partially into a recess 18 and thus detent therein.

Mounted circumjacent the shaft 12 is a disc-like plate or thurst washer 28 which bears against each of the three balls 26, being biased thereagainst by a compression spring 30, which bears against the washer 28 through the intermediacy of a plastic bearing ring 32. The opposite end of the spring 30 bears against a similar bearing ring 34 held in place by a snap ring 36.

Figure 3:
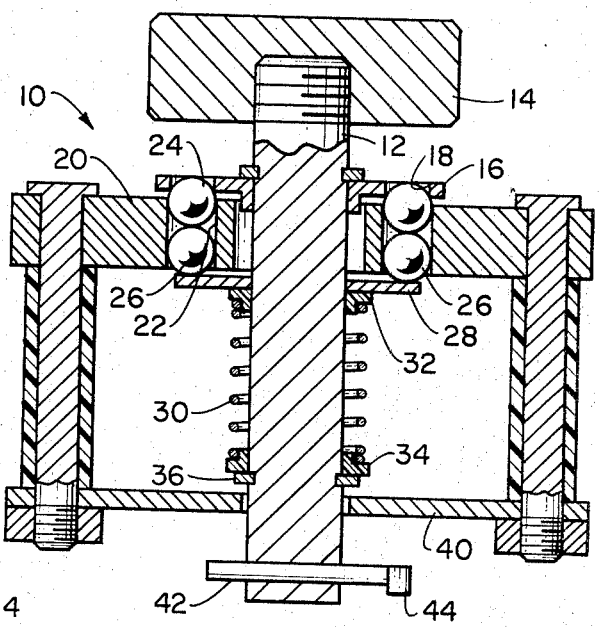
FIGS. 3 and 4 are sectional views taken on line 3—3 in FIG. 2.
Figure 4:
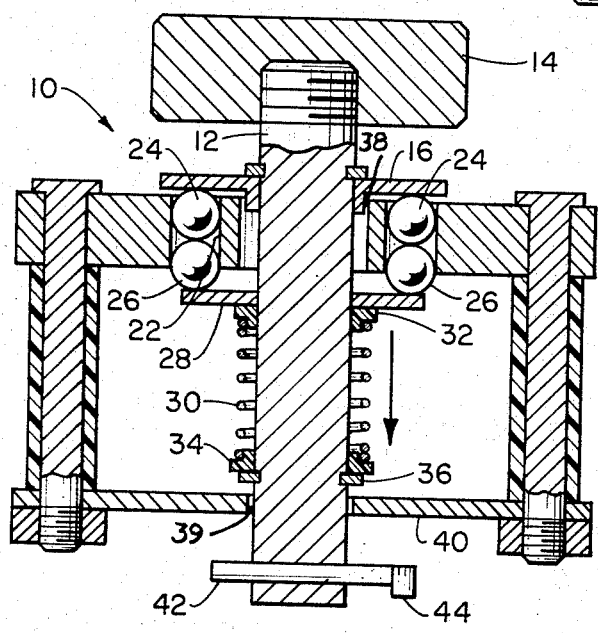

In the position shown in FIG. 3 the mechanism is in one of its detented positions, the number of such positions depending on the number of recesses 18 in the recess circle on the detent plate or wheel 16. When the shaft 12 is turned by the knob 14, the detent wheel 16 turns with it. Since the balls 24/26 are prevented from turning about the shaft 12, being restrained in the channel 22, they are pushed axially away from the recess 22 toward the thrust washer 28 against the bias of the spring 30, to the position shown in FIG. 4. As the next adjacent recess 18 comes into line with the ball 24, the balls are detented back into the position shown in FIG. 3. The shaft 12 is thus detent positioned at the new setting.

Rotation of the detent wheel 16, in addition to pushing the balls 24 and 26 axially in the channel 22, also causes the ball 24 to rotate about an axis radial to the shaft 12. This is done through rolling friction. Similarly, rolling friction between the balls 24 and 26 causes ball 26 to rotate in a direction opposite to 24. Finally, similar rolling friction between the ball 26 and thrust washer 28 causes the washer 28 to rotate in still the opposite direction, which is now the same rotative direction as the detent wheel 16. Thus, rotation of shaft 12 produces rotation of detent wheel 16 and thrust washer 28 in the same direction and at substantially the same speed, thereby virtually eliminating sliding friction typically inherent in detent mechanisms. The bearing rings 34 and 32 and the spring 30 of necessity rotate with the shaft 12, because they are frictionally coupled to the shaft by the snap ring 36.

The shaft 12, in addition to being journaled in the plate 20 at 38 is also journaled at 39 in another cross member 40 forming a portion of the frame 10.

Adjacent the end of the shaft 12 is mounted any mechanism which is to be rotatably adjusted in a detentable manner — here shown as a rotary switch arm 42 carrying a contact 44 which cooperates with a series of stationary electrical contacts not shown. These latter techniques are well known in the art, it being understood that this mechanism may be used where any detentable member is to be actuated, whether in the electrical, mechanical or other art. For example, shaft 12 could actuate a valve to a plurality of positions.

It will be appreciated from the above that by the use of the double balls 24/26, there is applied to the thrust washer 28 a rotation the same as that of the detent plate or wheel 16. Thus, sliding friction in the detent mechanism is substantially eliminated, with consequent minimizing of frictional drag on the shaft 12.

What is claimed is:

1. Detent mechanism comprising frame means,
   a detentable member movably mounted on said frame means and having
   a plurality of recesses,
   a pair of rotary members supported by said frame means, one of said rotary members bearing against the other, said other member being movable in and out of said recesses as said detentable member is moved, and
   means supported by said detentable member for biasing said rotary members toward said recesses.

2. Low friction detent mechanism comprising:
   a frame having at least one ball channel,
   a shaft rotatably mounted on said frame,
   a detent plate secured to said shaft adjacent said channel and having
   a plurality of recesses therein facing said channel and lying on a circle registerable with said channel as said shaft is turned,
   a pair of balls aligned in said channel and bearing against each other, one of said balls being movable in and out of said recesses as said shaft is rotated,
   rotation of said shaft causing said one ball to rotate and by friction also to rotate said other ball,
   a thrust washer circumjacent said shaft and bearing against said other ball, and
   a compression spring circumjacent said shaft and bearing against said thrust washer to bias said balls toward said detent plate.

3. Mechanism in accordance with claim 2 including:
   a plurality of said channels, equiangularly spaced around said circle
   each channel having a pair of said balls.

* * * * *